(12) United States Patent
Cool et al.

(10) Patent No.: US 7,631,302 B2
(45) Date of Patent: Dec. 8, 2009

(54) SYSTEM AND METHOD FOR VALIDATION OF ARGUMENTS PROVIDED TO AN APPLICATION

(75) Inventors: Jamie Lee Cool, Redmond, WA (US); Vivek B. Dalvi, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 566 days.

(21) Appl. No.: 11/001,520

(22) Filed: Nov. 30, 2004

(65) Prior Publication Data

US 2006/0130019 A1 Jun. 15, 2006

(51) Int. Cl.
G06F 9/45 (2006.01)
(52) U.S. Cl. ............................ 717/143; 717/112; 717/142
(58) Field of Classification Search ......... 717/106–108, 717/110–112, 120–121, 140–145
See application file for complete search history.

(56) References Cited

U.S. PATENT DOCUMENTS 6,253,325 B1 * 6/2001 Steele et al. .................. 726/5
6,381,736 B1 * 4/2002 Klotz et al. ................. 717/114

OTHER PUBLICATIONS

Lidor,"The Configuration Software Service", Jul. 2002, Sharp Development, pp. 1-20.*

* cited by examiner

Primary Examiner—Ted T Vo
(74) Attorney, Agent, or Firm—Workman Nydegger

(57) ABSTRACT

A system and method for validating arguments in a request to activate an application is provided. An application may include declarations with information for validating arguments provided with a request to activate the application. A compiler may then compile the source code of the application to generate an assembly with information for validating the arguments and may also generate an entry in a manifest with information identifying the assembly with the information for validating the arguments. The compiler may also generate an activation executable with executable code used for validating the arguments before the application may be executed. When a request may be received with arguments for activation of the application, activation code may validate the arguments and then execute the application code which may access the validated arguments.

6 Claims, 6 Drawing Sheets

SYSTEM AND METHOD FOR VALIDATION OF ARGUMENTS PROVIDED TO AN APPLICATION

FIELD OF THE INVENTION

The invention relates generally to computer systems, and more particularly to a system and method for validating arguments or parameters provided in a request to activate an application.

BACKGROUND OF THE INVENTION

Many user interfaces may allow a user to launch an application and provide a string with arguments for specifying behavior of the application. For example, a user may provide a user shell interface or command interpreter with a command to launch a word processing application by entering the name of the word processing application along with a filename as a command-line argument for specifying a file for the word processor to open. A web application may also be requested to be activated using a query string with arguments or parameters provided as part of a requested URL. Typically, the arguments or parameters are provided in an array of strings without specifying the type of the argument provided. Moreover, the arguments or parameters may not be validated before an application such as word processor or web application is activated. For instance, although an application may not accept specific types of input, there is no validation performed to verify acceptable types or values for arguments received with a request to activate an application.

A problem may arise if the application may not be able handle the type or value of an argument provided. For example, if the word processor expects an integer as a length of a stream in bytes but instead a string "ABC" is passed in, then the word processor may include appropriate conversion code that tries to convert "ABC" into an integer and also has error handling functionality and may return an error message when conversion fails. If the error handling functionality is not robust enough, then the word processor may crash. As a result, it has become the responsibility of an application developer to convert argument values provided as part of a request to activate an application from an array of strings to the appropriate type and check for invalid values. In doing so, the application developer must consider the range of unacceptable values so that the program may be robust to unexpected input.

Unfortunately, there is no infrastructure in place for an application developer to declaratively specify the type or range values of acceptable arguments that may be provided with a request to activate an application so that the arguments may be validated before the application is executed. Since such arguments may not be declared or validated prior to execution of application, a warning may not be provided to a user that an application may not accept an invalid argument. If such warning is to be provided, then it is the application that has to implement this warning in an appropriate user interface as part of their error handling code. Moreover, system security may be breached by an application that may receive invalid inputs.

What is needed is a way for declaratively specifying arguments with meta data, including their associated type and range, that can be provided in a request to activate an application and for validating such arguments before activating the application.

SUMMARY OF THE INVENTION

Briefly, the present invention provides a system and method for validating arguments or parameters provided in a request to activate an application. To this end, an application may include declarations with information for validating arguments provided with a request to activate the application. The application may be operably coupled to a compiler for compiling the source code of the application to generate an assembly with a class that represents arguments which may be received with a request for activation of the application, along with meta data that may be used to perform additional validations to type checking. The compiler may also generate an entry in a manifest with information identifying the assembly and the class that holds information for validating the arguments.

The present invention additionally provides a method for validating arguments or parameters provided in a request to activate an application. Source code for an application may be developed to include information for validating arguments received with a request for activation of the application. In one embodiment, a class defining properties corresponding to arguments that may be provided with a request to activate the application may be declared in the source code for the application. Furthermore, attributes describing constraints for the values of the properties may be declared. The source code may then be compiled to generate an assembly with the class for validating the arguments and to generate a manifest with information identifying the assembly with the class for validating the arguments.

When a request may be received with arguments for activation of the application, activation code may look in a manifest for the class with properties corresponding to the arguments and identify the assembly with the class for validating the arguments. An instance of the class may be created. Each argument value may be converted into the type specified by the corresponding property in the class. Any attributes describing constraints for the value of the property may also be validated. And then a valid property value may then be assigned to the property of the class. Finally, this instance of the class, populated with valid property values from the arguments received, may be exposed via an application activation object model and the application may then be executed. Application code may use APIs to get access to the instance of a class that may hold arguments or parameters.

Advantageously, the system and method may validate arguments received with a request to activate any type of application including an installed application that may have arguments provided on a command line and a web application that may have arguments provided in a query request for accessing a URL. The system and method may reduce the risk of system security breaches that may occur by an application receiving invalid inputs. The system and method may also reduce the overhead of performing type conversion. Furthermore, an application may provide executable code for additional type checking and validation of the argument string received before the application may be executed.

Other advantages will become apparent from the following detailed description when taken in conjunction with the drawings, in which:

DETAILED DESCRIPTION

Exemplary Operating Environment

Figure 1:
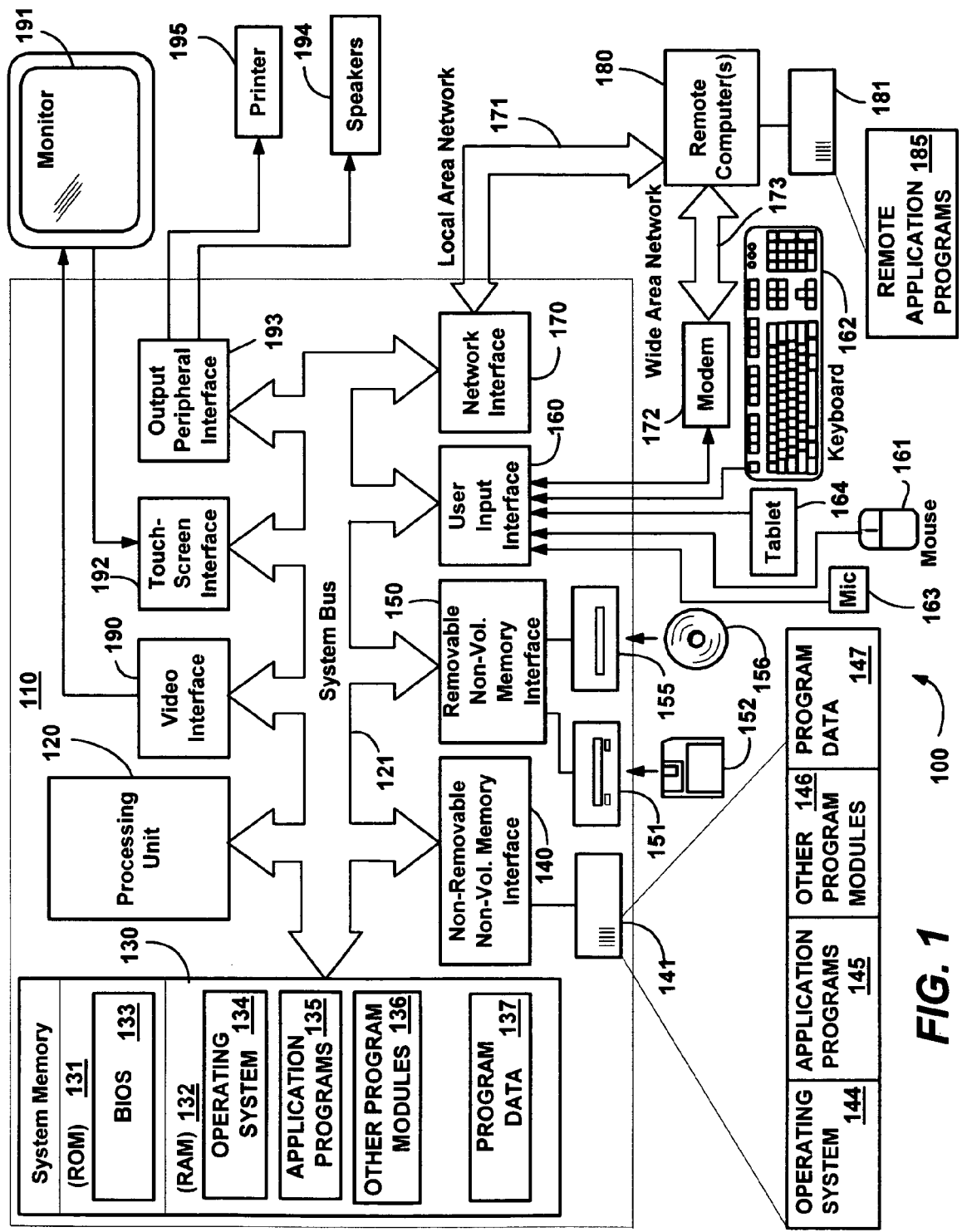
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, headless servers, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or other devices including a device that contains a biometric sensor, environmental sensor, position sensor, or other type of sensor. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 192 or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 194 and printer 195, which may be connected through an output peripheral interface 193 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Validating Arguments Provided in a Request to Activate in Application

The present invention is generally directed towards a system and method for validating arguments or parameters provided in a request to activate an application. The system and method may validate arguments received with a request to activate any type of application including an installed application that may have arguments provided on a command line and a web application that may have arguments provided in a query request for accessing a URL. As will be seen, the present invention may implement a framework that supports a common way for type checking arguments provided as part of a request to activate executable code independent of whether the executable code may be installed, hosted or remotely executed. Thus, the application developer need not change any type checking code for different target versions of the executable code such as an installed application or a web version. As will be understood, the various block diagrams, flow charts and scenarios described herein are only examples, and there are many other scenarios to which the present invention will apply.

Figure 2:
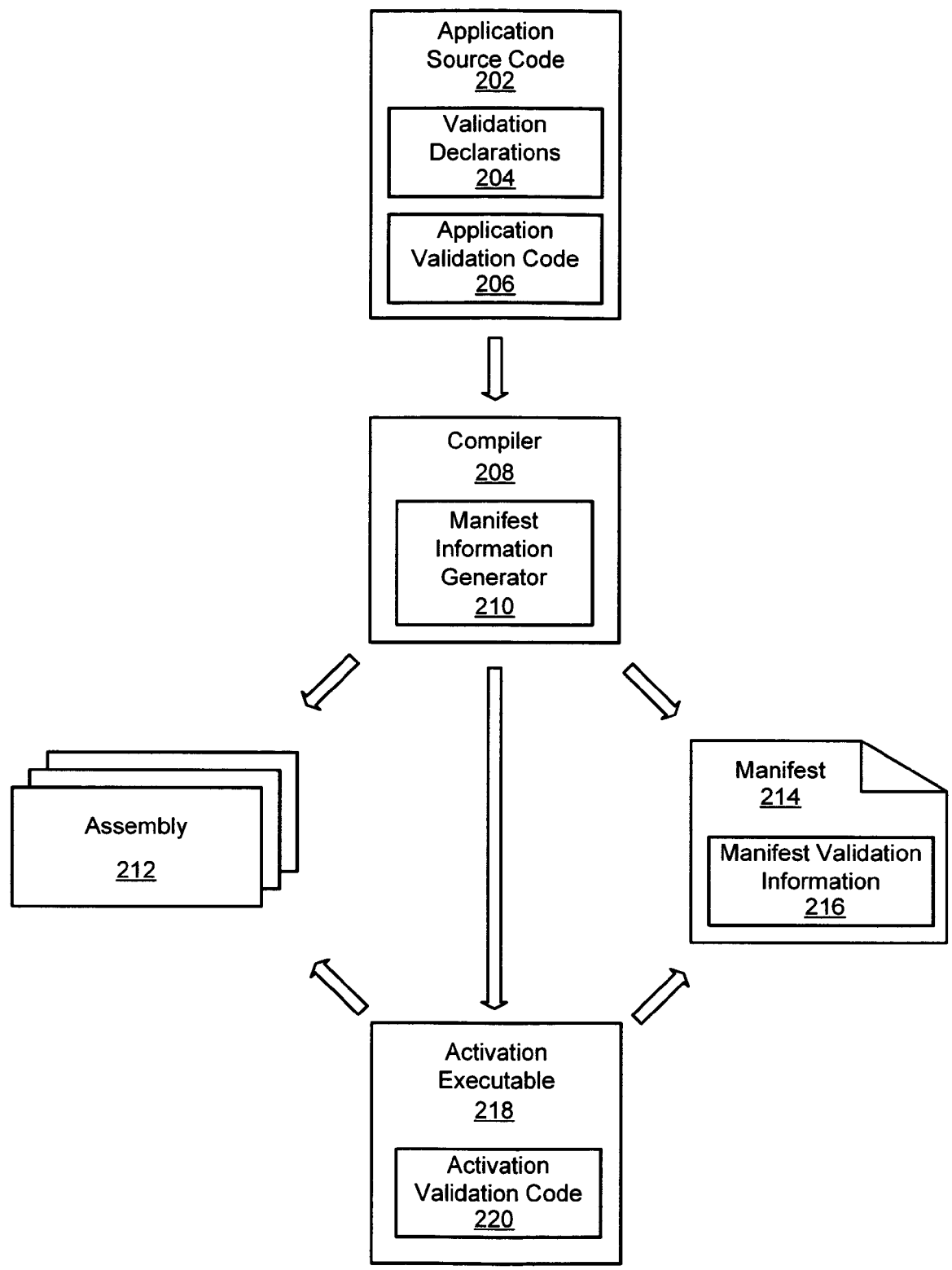
FIG. 2 is a block diagram generally representing an exemplary architecture of system components for validating arguments provided in a request to activate an application, in accordance with an aspect of the present invention.

Turning to FIG. 2 of the drawings, there is shown a block diagram generally representing an exemplary architecture of system components for validating arguments provided in a request to activate an application. Those skilled in the art will appreciate that the functionality implemented within the blocks illustrated in the diagram may be implemented as separate components or the functionality of several or all of the blocks may be implemented within a single component. For example, the functionality for the manifest information generator 210 of the compiler 208 may be implemented as a separate component.

The application source code 202 may be source code for any type of general or special purpose application that may receive arguments such as command-line arguments from a user interface shell or a web application that may receive arguments in a query string. A web application as used herein means executable code that may be activated by requesting access to a URL. The application source code 202 may include validation declarations 204 that may specify strongly-typed arguments and associated constraints acceptable by the application 202. The application source code 202 may also include application validation code 206 that may provide, among other functionality, filtering of an argument string to detect, for example, malicious code. The application source code 202 may be operably coupled to a compiler 208 that may compile the source code of the application and may generate a manifest.

The compiler 208 may be operably coupled to a manifest 214 and the compiler may include a manifest information generator 210 for generating an entry in a manifest 214 that may specify which assembly may have validation information used to validate the arguments provided in a request to activate the application. A manifest as used herein may mean a file or other structure of a computer storage medium. The manifest 214 may include manifest validation information 216 used for identifying an assembly that has a class with properties corresponding to acceptable arguments that can be provided in a request to activate the application. The compiler 208 may generate one or more assemblies 212 from the source code of the application. The compiler may also generate activation code for an activation executable 218. The activation executable 218 may be operably coupled to the assemblies 212 and the manifest 214 and may include activation validation code 220 for validating the arguments provided in a request to activate the application before executing the application. In general, the activation executable may be part of an operating system along with other operating system components provided.

Figure 3:
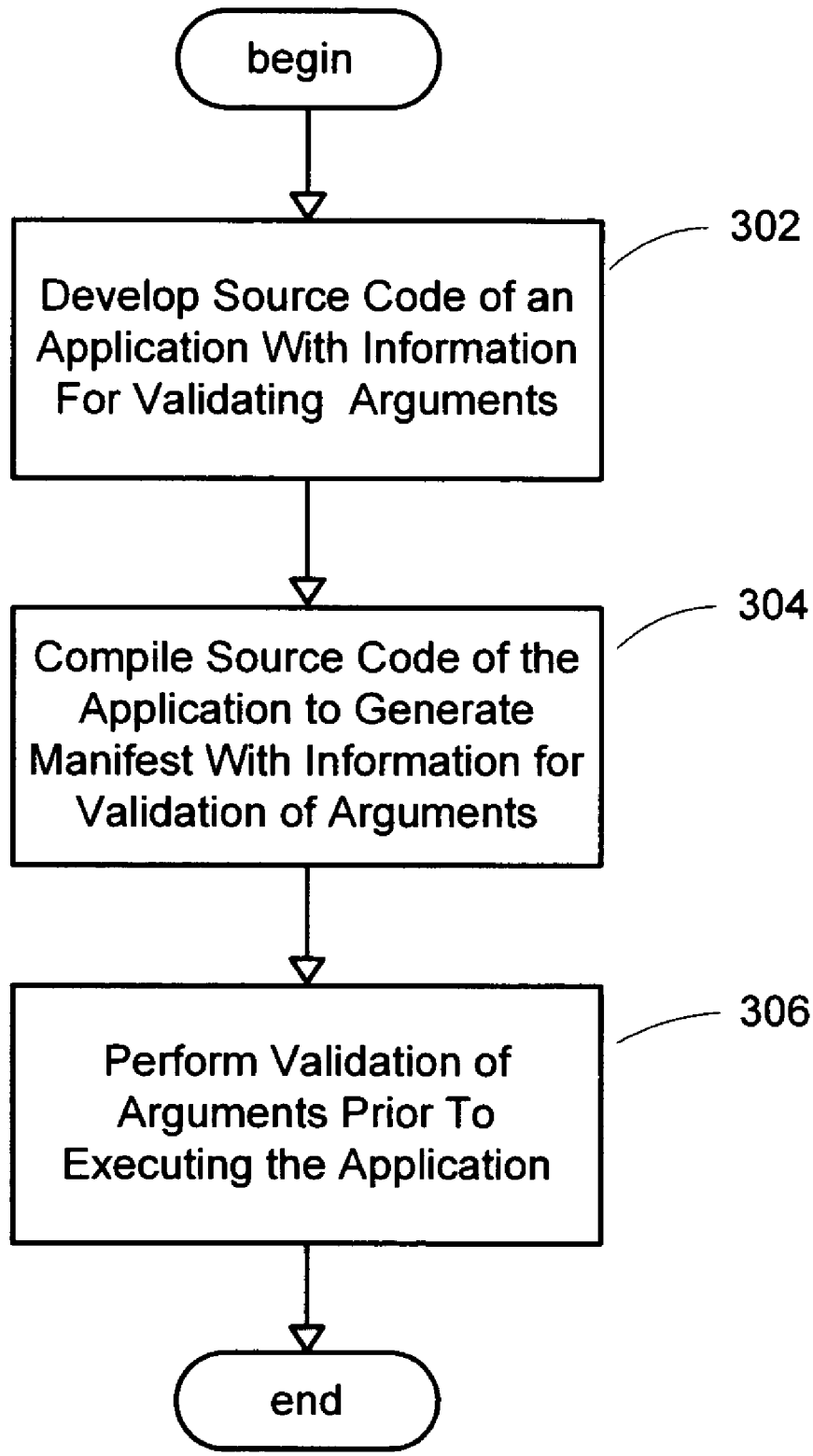
FIG. 3 is a flowchart generally representing the steps undertaken in an embodiment for validating arguments provided in a request to activate an application, in accordance with an aspect of the present invention.

FIG. 3 presents a flowchart generally representing the steps undertaken in an embodiment for validating arguments provided in a request to activate an application. At step 302, the source code of an application including information for validating arguments provided in a request to activate the application may be developed. The source code of the application may be any type of source code, which may be compiled to executable code. In one embodiment, the application may be an installed application on a computer system. In another embodiment, the application may be a web application.

Next, the source code of the application may be compiled to generate an assembly and a manifest that includes information for validating arguments at step 304. The manifest may specify which assembly may include the validation class used to validate the arguments. Once the application source code may be compiled and an entry in the manifest may be made specifying the assembly having the validation class used to validate the arguments, then validation of the arguments may be performed at step 306 before executing the application. For instance, code receiving the arguments that may activate the application with the arguments may first perform type checking and validation of other constraints associated with the arguments before activating the application.

Figure 4:
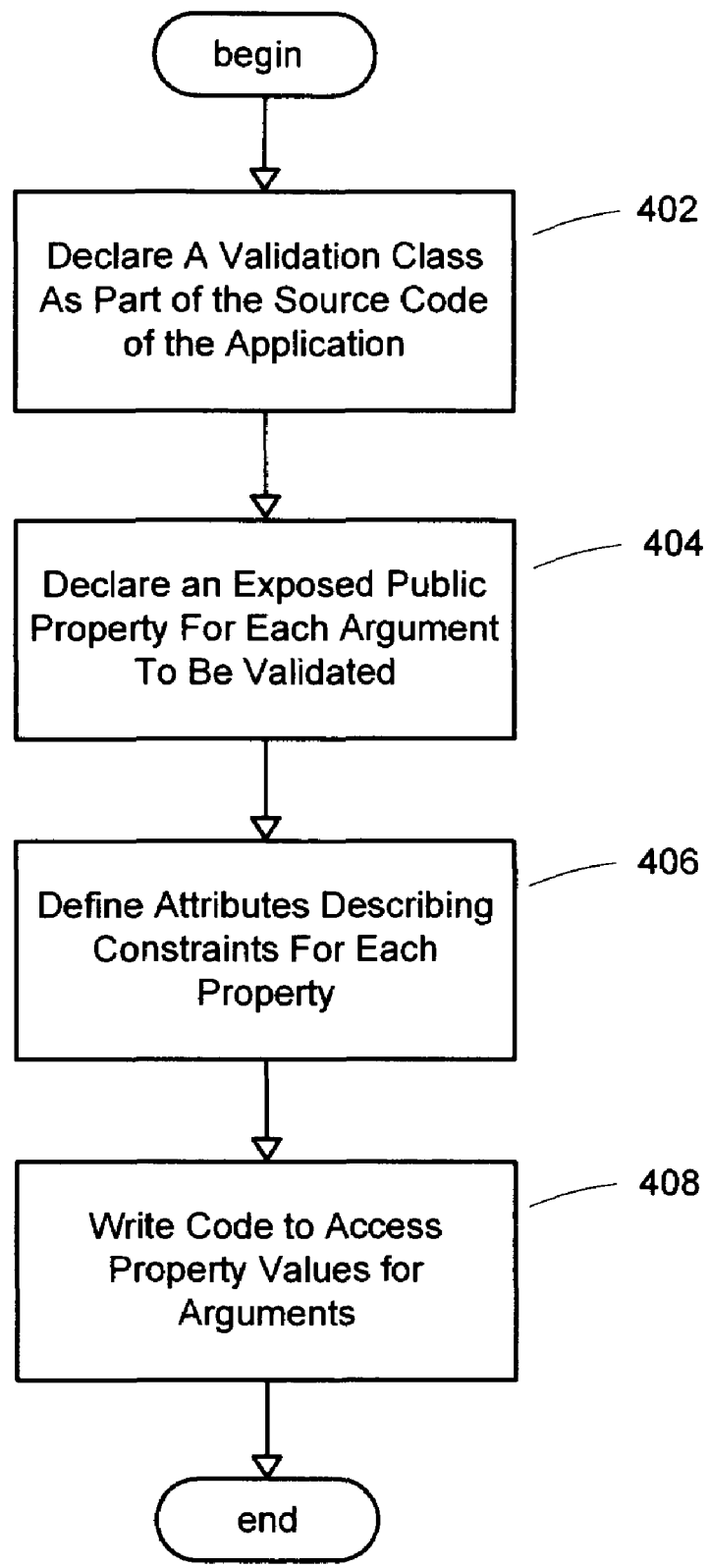
FIG. 4 is a flowchart generally representing the steps undertaken in an embodiment to develop the source code of an application with information for validation of arguments that may be provided in a request to activate the application, in accordance with an aspect of the present invention.

FIG. 4 presents a flowchart generally representing the steps undertaken in an embodiment to develop the source code of an application with information for validation of arguments that may be provided in a request to activate the application as indicated at step 302 of FIG. 3. At step 402, a validation class may be declared as part of the source code of the application. In one embodiment, the validation class may be derived from a base class such as StartUpInfoBase defined as follows:

```
class StartupInfoBase
{
    public IDictionary Args {get; set;}
    public event StartupInfoCreatingEventHandler
StartupInfoCreating;
}
public sealed delegate void
StartupInfoCreatingEventHandler(object sender, EventArgs
e);
```

A developer may create a class derived from this base class to inherit a property collection provided by this base class for storing all the arguments along with their names. For instance, the arguments may be stored in a dictionary exposed by the base class StartUpInfoBase. This base class may also expose an event that an application may receive in order to provide code to perform additional validation of an argument string as desired. In an embodiment, an event may be exposed so that when activation validation code may be validating an argument, an event may be generated that a StartupInfoEventHandler may receive for executing validation code such as additional type checking or filtering the argument string. The application developer who may have specific knowledge about the semantics of the string and may perform additional type checking may provide the code executed by the StartupInfoEventHandler upon receiving the event generated. This enables specific applications to develop their own strong type checker in addition to the checks that may be put into the manifest by the compiler. The event handler may be in the application and may execute the code of the event handler, for example, when the application is launched.

After a validation class may be declared as part of the source code of the application, a public property may be declared and exposed that may store each argument to be validated at step 404. This may be accomplished through inheritance by creating a class derived from the base class, StartUpInfoBase, that may expose a property collection for storing arguments with their names. Each property declared may include the type of value acceptable for the respective argument. In addition to declaring a public property for each argument, attributes may be defined for describing specific constraints for a property value associated with each property at step 406. For example, range values may be defined for a property value. Furthermore, a set of default attributes may be provided in an embodiment that may be used by a developer such as a range for property values, maximum string length, minimum value, maximum value, and so forth.

Once properties and any attributes describing associated constraints are declared, code to access the property value for each argument stored in the property collection may be written at step 406. When the application may be executed, this code may access the property values stored in the property collection for use by the application as input arguments.

Figure 5:
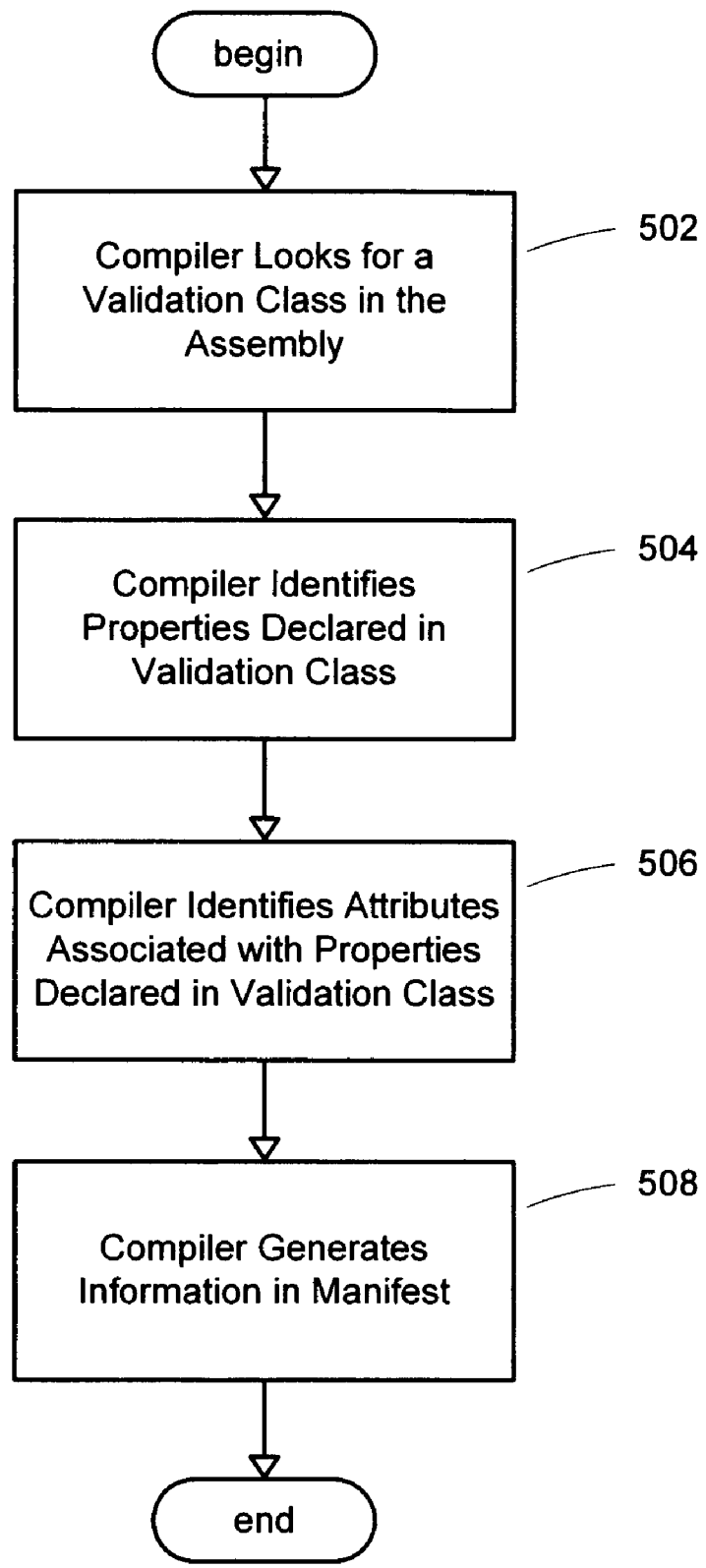
FIG. 5 is a flowchart generally representing the steps undertaken in an embodiment for compiling source code of the application to generate a manifest entry for validating arguments, in accordance with an aspect of the present invention.

FIG. 5 presents a flowchart generally representing the steps undertaken in an embodiment for compiling source code of the application to generate a manifest entry for validating arguments as indicated at step 304 of FIG. 3. Those skilled in the art will appreciate that an implementation may choose to perform these steps in a different order for purposes of efficiency or flexibility, while achieving the same effect and without departing from the scope of the present invention. At step 502 a compiler may look for a validation class which may be derived, for example, from a base class such as the StartupInfoBase class. At step 504, the compiler may identify properties declared in the validation class. At step 506, the compiler may identify attributes associated with properties declared in the validation class. Finally, the compiler may generate an entry in a manifest for validating arguments that may be provided in a request to activate the application at step 508. The entry may include the name of the validation class having one or more properties corresponding to the list of one or more arguments. The entry may also include the name of the assembly which includes the validation class.

Figure 6:
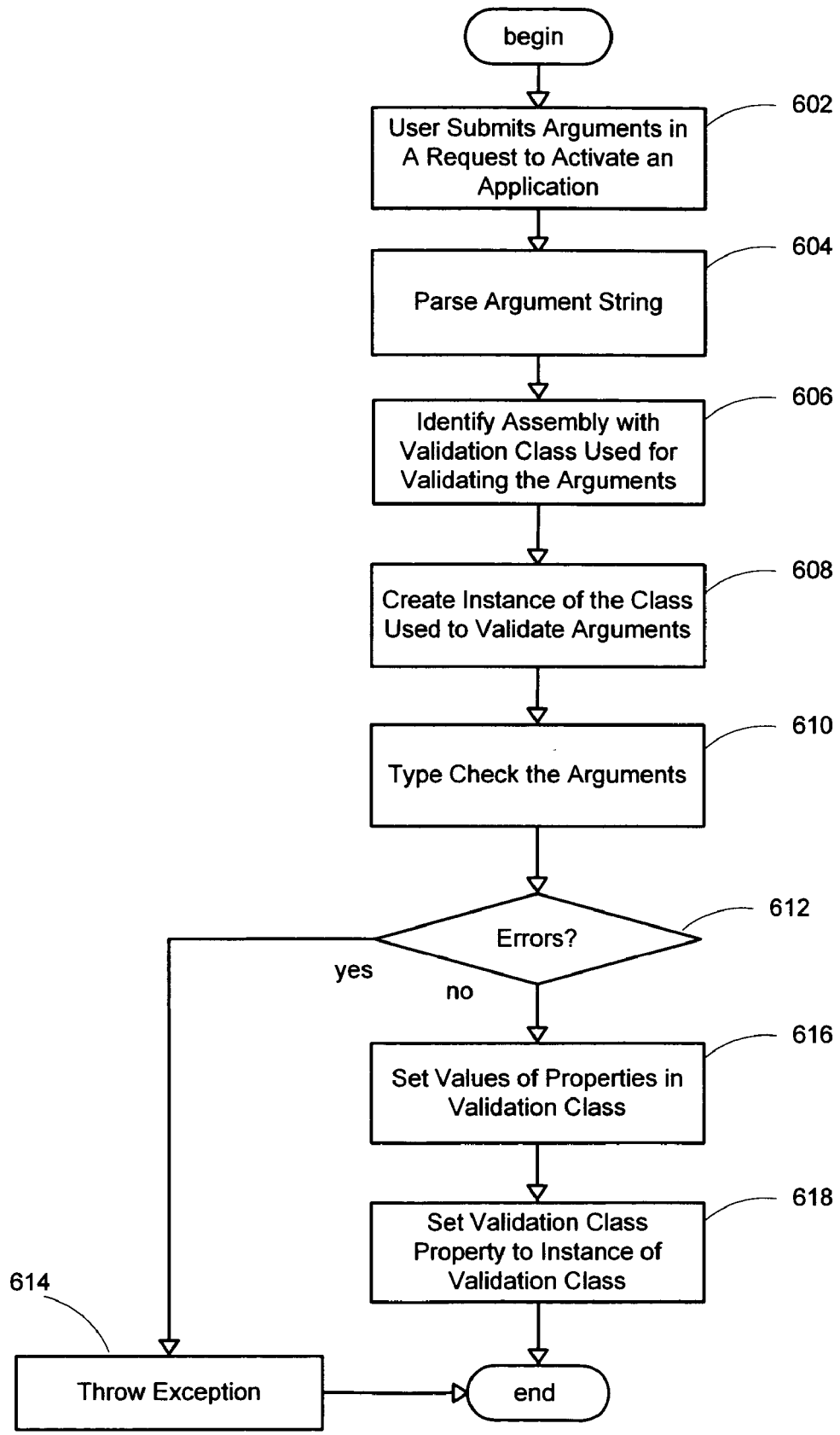
FIG. 6 is a flowchart generally representing the steps undertaken in an embodiment for validation of arguments before executing the application, in accordance with an aspect of the present invention.

FIG. 6 presents a flowchart generally representing the steps undertaken in an embodiment for validation of arguments before executing the application. At step 602 a user may submit arguments in a request to activate an application. In one embodiment the user may submit arguments in a request to activate an application by submitting a command including a string of one or more command-line arguments to a user interface shell or command interpreter for activation of an application to execute the specified command. In another embodiment, a user may submit arguments in a request to activate an application by selecting a URL presented by an application that may include a query string with arguments for activation of a web application to execute the specified query. The application that may present the URL for selection may any type of application including a web browser, search engine, installed application presenting a hyperlink, and so forth.

At step 604, the argument string submitted in the request may be parsed. In one embodiment, the argument string may be a list of command-line arguments submitted in a string as part of a command received by a user interface shell or command interpreter. In another embodiment, the argument string may be a query string submitted as part of a request to access a URL.

At step 606, the assembly with the validation class used for validating the arguments may be identified. In an embodiment, the assembly with the validation class may be identified by using one or more arguments to look up the validation class and its assembly in a manifest generated during compilation of the application. In an alternate embodiment, the validation class and the assembly having the compiled validation class may be stored as separate entries in the manifest. At step 608, an instance of the validation class identified may be instantiated. In an embodiment, the activation executable may instantiate the validation class. At step 610 the arguments may be type checked by using the properties of the validation class. For instance, the activation executable may use each argument name obtained by parsing the argument string to get a property value of the property exposed by the validation class with the same name. Each argument value may be converted from a string type to the proper type specified in the validation class. In an embodiment, attributes describing additional specific constraints for a property value may also be validated as part of step 610. In one embodiment, additional validation code provided by an application may be executed by the activation executable to validate the arguments in the string. This may provide the capability to detect an argument string with malicious code.

At step 612 it may be determined whether any errors occurred in type checking an argument type or in validation an attribute of a property value. If so, then an exception may be thrown at step 614 and then processing may be finished. In an embodiment, a user may be first notified of the error before processing is finished. Otherwise, if the argument values are each of the appropriate property type and have valid attributes, then each property in the validation class may be assigned the corresponding value converted from the argument string at step 616.

Finally, at step 618 the validation class property of the application may be set to be the value of the instance of the validation class that was created and populated with validated property values. Once the validation class property of the application has been set, processing is finished.

When the application is then executed, the property values stored in the validation class that have been validated may be used by the application as input arguments. Thus, the infrastructure of the present invention may support an application developer to declaratively specify the type or range values of acceptable arguments that may be provided with a request to activate an application so that the arguments may be validated before the application is executed. Since such arguments may be declared or validated prior to execution of application, a warning may also be provided to a user that an application may not accept an invalid argument when an invalid argument is detected.

As can be seen from the foregoing detailed description, the present invention provides an improved system and method for validating arguments or parameters provided in a request to activate an application. Furthermore, the system and method provided are flexible and extensible for validating such arguments. The framework of the present invention will advantageously work for installed applications that may have arguments provided on a command line and for web applications that may have argument included as part of a query string for requesting access to a URL. As is now understood, the present invention may advantageously be used to validate arguments provided in a request to activate any application. As an additional benefit, the present invention may improve security of an application by supporting executable code that may be provided by an application for additional filtering of an argument string received before the application may be executed to detect for example malicious code. The system and method thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method in a computer system for validating arguments received with a request to activate a computer application, the request being received and validated prior to the activation of the computer application, the method comprising:

receiving the request to activate a computer application, the request having one or more arguments to be validated;

accessing a manifest associated with the computer application, the manifest containing information for identifying a compiler generated assembly with information for validating the one or more arguments received with the request to activate the computer application;

identifying the compiler generated assembly indicated in the manifest associated with the computer application;

instantiating an instance of a class in the identified compiler generated assembly, the instance of the class being utilized to validate the arguments received in the request;

type checking the one or more arguments utilizing the instantiated instance of the class in the compiler generated assembly;

setting a value of one or more properties of the class corresponding to the one or more arguments; and activating the computer application, wherein one or more properties of the computer application are set to the value of the one or more properties of the class corresponding to the one or more arguments received in the request to activate the application, such that the computer application is activated with one or more validated properties corresponding to the one or more arguments received in the request.

2. The method of claim 1 further comprising validating a constraint associated with one or more properties corresponding to the one or more arguments.

3. A computer-readable storage media storing computer-executable instructions that when executed perform a method for validating arguments received with a request to activate a computer application, the request being received and validated prior to the activation of the computer application, the method comprising:

receiving the request to activate a computer application, the request having one or more arguments to be validated;

accessing a manifest associated with the computer application, the manifest containing information for identifying a compiler generated assembly with information for validating the one or more arguments received with the request to activate the computer application;

identifying the compiler generated assembly indicated in the manifest associated with the computer application;

instantiating an instance of a class identified in the compiler generated assembly, the instance of the class being utilized to validate the arguments received in the request;

type checking the one or more arguments utilizing the instantiated instance of the class in the compiler generated assembly;

setting a value of one or more properties of the class corresponding to the one or more arguments; and activating the computer application, wherein one or more properties of the computer application are set to the value of the one or more properties of the class corresponding to the one or more arguments received in the request to activate the application, such that the computer application is activated with one or more validated properties corresponding to with the one or more arguments received in the request.

4. A computer system for validating arguments provided in a request to activate a computer application, wherein the arguments are validated prior to the application being activated, the computer system comprising:

a computer processor for executing computer executable instructions;

a computer readable storage media storing computer executable instructions that when executed perform a method, the method comprising:

receiving a request to activate a computer application, the request comprising a string containing one or more arguments requiring validation;

in response to the request to activate the computer application, parsing the string to obtain an argument name for each argument contained in the request to activate the computer application;

accessing a manifest associated with the computer application, the manifest containing information for identifying a compiler generated assembly with information for validating the one or more arguments received with the request to activate the computer application;

identifying the compiler-generated assembly indicated in the manifest associated with the computer application, wherein the identified compiler generated assembly contains a validation class for validating the arguments;

instantiating an instance of the validation class for validating the arguments;

validating the arguments utilizing the argument name of each argument and properties of the validation class associated with the argument name;

converting each argument from a string to a type specified in the validation class;

assigning a value of each converted argument to a corresponding property in the instance of the validation class;

setting the validation class to correspond to the value of the instance of validation class that was created and assigned with validated property values; and activating the application using as inputs the property values stored in the validation class containing the validated property values.

5. The computer system of claim 4, wherein the string containing one or more arguments requiring validation is submitted by a user using a command line interface.

6. The computer system of claim 5, wherein the string containing one or more arguments requiring validation is submitted by a user as part of a request to access a universal resource locator URL.

* * * * *